United States Patent
Molnar

(10) Patent No.: US 8,145,903 B2
(45) Date of Patent: Mar. 27, 2012

(54) METHOD AND SYSTEM FOR A KERNEL LOCK VALIDATOR

(75) Inventor: Ingo Molnar, Grünheide-Kagel (DE)

(73) Assignee: Red Hat, Inc., Raleigh, NC (US)

( * ) Notice: Subject to any disclaimer, the term of this patent is extended or adjusted under 35 U.S.C. 154(b) by 1024 days.

(21) Appl. No.: 11/753,643

(22) Filed: May 25, 2007

(65) Prior Publication Data

US 2008/0294892 A1 Nov. 27, 2008

(51) Int. Cl.
H04L 29/06 (2006.01)
(52) U.S. Cl. ........ 713/164; 713/166; 713/167; 380/264; 380/268; 707/704; 707/687; 711/216; 705/150
(58) Field of Classification Search .................. 713/164; 705/59–64; 711/150–152; 707/687–704
See application file for complete search history.

(56) References Cited

U.S. PATENT DOCUMENTS

| | | | | |
|---|---|---|---|---|
| 5,636,371 A * | 6/1997 | Yu | | 703/26 |
| 5,983,225 A * | 11/1999 | Anfindsen | | 1/1 |
| 6,715,085 B2 * | 3/2004 | Foster et al. | | 726/27 |
| 6,751,617 B1 * | 6/2004 | Anfindsen | | 1/1 |
| 6,981,110 B1 * | 12/2005 | Melvin | | 711/154 |
| 7,500,036 B2 * | 3/2009 | McKenney et al. | | 710/200 |
| 7,565,532 B2 * | 7/2009 | Pham et al. | | 713/165 |
| 7,716,423 B2 * | 5/2010 | Irish et al. | | 711/133 |
| 7,827,223 B2 * | 11/2010 | Gressel et al. | | 708/250 |
| 7,895,124 B2 * | 2/2011 | Baratti et al. | | 705/57 |
| 7,903,689 B2 * | 3/2011 | Niinomi et al. | | 370/474 |
| 2003/0229794 A1 * | 12/2003 | Sutton et al. | | 713/189 |
| 2004/0054861 A1 * | 3/2004 | Harres | | 711/163 |
| 2004/0128551 A1 * | 7/2004 | Walker et al. | | 713/201 |
| 2005/0055536 A1 * | 3/2005 | Ansari | | 712/4 |
| 2005/0144330 A1 * | 6/2005 | Richardson | | 710/1 |
| 2005/0166187 A1 * | 7/2005 | Das et al. | | 717/136 |
| 2006/0036789 A1 * | 2/2006 | Lee | | 710/200 |
| 2006/0059496 A1 * | 3/2006 | Joy et al. | | 719/310 |
| 2007/0074172 A1 * | 3/2007 | Bird et al. | | 717/127 |
| 2008/0034429 A1 * | 2/2008 | Schneider | | 726/23 |
| 2008/0184249 A1 * | 7/2008 | Adams et al. | | 718/104 |
| 2008/0294892 A1 * | 11/2008 | Molnar | | 713/164 |

* cited by examiner

*Primary Examiner* — Nathan Flynn
*Assistant Examiner* — Viral Lakhia
(74) *Attorney, Agent, or Firm* — Lowenstein Sandler PC

(57) ABSTRACT

An embodiment relates generally to a method of preventing resource access conflicts in a software component. The method includes intercepting a lock operation in the software component and testing an associated lock type of the lock operation against a set of rules. The method also includes determining an action based on the associated lock type conflicting one of the rules of the set of rules.

22 Claims, 4 Drawing Sheets

METHOD AND SYSTEM FOR A KERNEL LOCK VALIDATOR

FIELD

This invention relates generally to locks, more particularly to methods and systems for a kernel lock validator to manage locks.

DESCRIPTION OF THE RELATED ART

Locks are a primitive utilized by the kernel to manage the resources of a computing system. Without locks, different parts of a computer system can collide when trying to access the same resources, leading to data corruption and general chaos. However, managing locks is a challenging programming task because the number of instances of locks, the type of locks and the cost of not resolving deadlocks.

The fundamental issue surrounding locking is the need to provide synchronization in certain code paths in the kernel. These code paths, called critical sections, require some combination of concurrency or re-entrancy protection and proper ordering with respect to other events. The typical result without proper locking is called a race condition. As a simple example, consider two locks L1 and L2. Any code which requires both locks must tale care to acquire the locks in the right order. If one function acquires L1 before L2, but another function acquires them in the opposite order, eventually the system will find itself in a situation where each function has acquired one lock and is blocked waiting for the other—a deadlock.

This is not to say that the only locking issues arise from SMP (symmetric multiprocessing). Interrupt handlers create locking issues and any code can block (go to sleep). Of these, only SMP is considered true concurrency, i.e., only with SMP can two things actually occur at the exact same time. The other situations—interrupt handlers, preempt-kernel and blocking methods—provide pseudo concurrency as code is not actually executed concurrently, but separate code can mangle one another's data.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
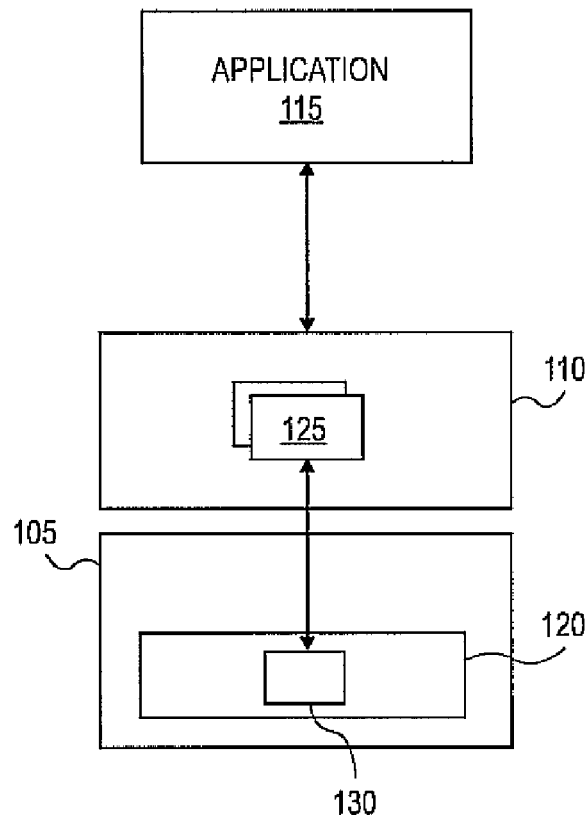
FIG. 1 depicts a software environment in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of operating systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, methods and apparatus for a lock validator to prevent resource access conflicts in a software component such as users-pace or a kernel. More particularly, the lock validator can be configured to track the state of locks-types and it maintains dependencies between the different lock-types. The lock validator can also be configured to maintain a rolling proof that the state of the lock-types and the dependencies are correct.

Embodiments of the lock validator can be configured to track lock-types as opposed to tracking each individual instance of the lock-type. Unlike a lock instantiation, the lock-type is registered when it used for the first time after bootup and all subsequent uses of the registered lock-type will be attached to this lock-type. Accordingly, each lock type is assigned a specific key based on the registration of the lock-type. The lock validator can be configured to create a static variable (e.g., (_key)) for statically declared locks and uses the address of the statically declared lock as the key.

The lock validator can also be configured to track lock-type usage by using five separate state bits: (1) ever held in hard interrupt context (hardirq-safe); (2) ever held in soft interrupt context (softirg-safe); (3) ever held in hard interrupt with interrupts enabled (hardirq-unsafe); (4) ever held with soft interrupts and hard interrupts enabled (softirq-unsafe); and (5) ever used (!unused). With these state bits, the lock validator can be configured to test each locking operation. More particularly, the lock validator tests each locking operation against a number of rules. A softirq-unsafe is automatically a hardirq-unsafe is an example of one rule. Another rule is that following states are exclusive, i.e., can only be set for any lock type: (1) hardirq-safe and hardirq-unsafe; and (2) softirq-safe and softirq-unsafe. Yet another rule is that the same lock-type cannot be acquired twice as well as two locks cannot be acquired in different order. Yet another rule is that the following lock dependencies are not permitted: (1) hardirq-safe to hardirq-unsafe; and (2) softirq-safe to softirq-unsafe. Accordingly, the above rules are enforced for any locking sequence that occurs in the kernel: when acquiring a new lock, the lock validator checks whether there is any rule violation between the new lock and any of the held locks.

When a lock-type changes state, the following additional rules are tested: (1) if a new hardirq-safe lock is discovered, the lock validator determines whether it took any hardirq-unsafe lock in the past; (2) if a new softirq-safe lock is discovered, the lock validator determines whether it took any softirq-unsafe lock in the past; (3) if a new hardirq-unsafe lock is discovered, the lock validator determines whether any hardirq-safe lock took it in the past; and (4) if a new softirq-unsafe lock is discovered, the lock validator determines whether any softirq-safe lock took it in the past. Accordingly, the lock validator can be configured to report the rule violation where it can be used to modify the behavior of the software component (e.g., kernel or application) to mitigate the effect of the lock violation.

The above rules require massive amounts of runtime checking. If this checking were done for every lock taken and for every interrupt ("irqs")-enabled event, it would render the system practically unusably slow. The complexity of checking is $O(N^2)$. Accordingly, tens of thousands of check would be performed for every event even with just a few hundred lock-types. Embodiments of the present invention resolve this issue by checking any given 'locking scenario' (unique sequence of locks taken after each other) only once. A simple stack of held locks is maintained, and a lightweight 64-bit hash value is calculated when the sequence (or chain) is validated for the first time. This hash value, which is unique for every lock chain. The hash value is then put into a hash table, which can be checked in a lock-free manner. If the locking chain occurs again later on, the hash table can notify the lock validator not to validate the chain again.

FIG. 1 illustrates an exemplary environment 100 configured to implement a kernel lock validator. It should be readily obvious to one of skilled in that art that the environment 100 depicted in FIG. 1 is a schematic illustration and additional components can be added and existing components can be modified or removed.

As shown in FIG. 1, the environment 100 can include an operating system 105. The operating system 105 may be a version of a Linux™, UNIX™, Windows™, or similar multi-tasking operating system. The operating system 105 can also comprise a kernel 120. The kernel 120 can be configured to mange the resources of the environment 100 and the communication between hardware and software components. The kernel 120 can also provide the lowest level abstraction layer for the resources (especially memory, processors, and input/output devices) that applications must control to perform their function.

A run-time environment 110 can be configured to execute on the operating system 105. The run-time environment 110 can provide a set of software tools that supports the execution of applications/programs. The run-time environment 110 can include an application program interface ("API", not shown) and a complementary API (not shown) within an application 115. The API can be configured to provide a set of routines that the application 115 uses to request lower level services performed by the kernel 120.

The run-time environment 110 can also be configured to provide for userspace 125 for a user. In some multi-user operating systems, such as Linux, can support multiple users. The userspace 125 can be configured to provide space for a user to execute applications through appropriate software tools known to those skilled in the art. As part of the software tools, the user space 125 can be provided with locks. A lock is a synchronization mechanism for enforcing limits on access to a resource managed by the operating system 105.

The kernel 120 can also be configured to implement a kernel lock validator 130 to manage the locks being used by the applications, processes, tasks executing in the userspace 125. The kernel lock validator 130 can be configured to track the state of locks-types and maintain dependencies between the different lock-types. The kernel lock validator 130 can also be configured to maintain a rolling proof that the state of the lock-types and the dependencies are correct.

The kernel lock validator 130 can further be track lock-types. Unlike a lock instantiation, the lock-type is registered when it used for the first time after bootup and all subsequent uses of the registered lock-type will be attached to this lock-type, Accordingly, each lock type is assigned a specific key based on the registration of the lock-type. The kernel lock validator 130 can be configured to create a static variable (e.g., (_key)) for statically declared locks and uses the address of the statically declared lock as the key.

Figure 2:
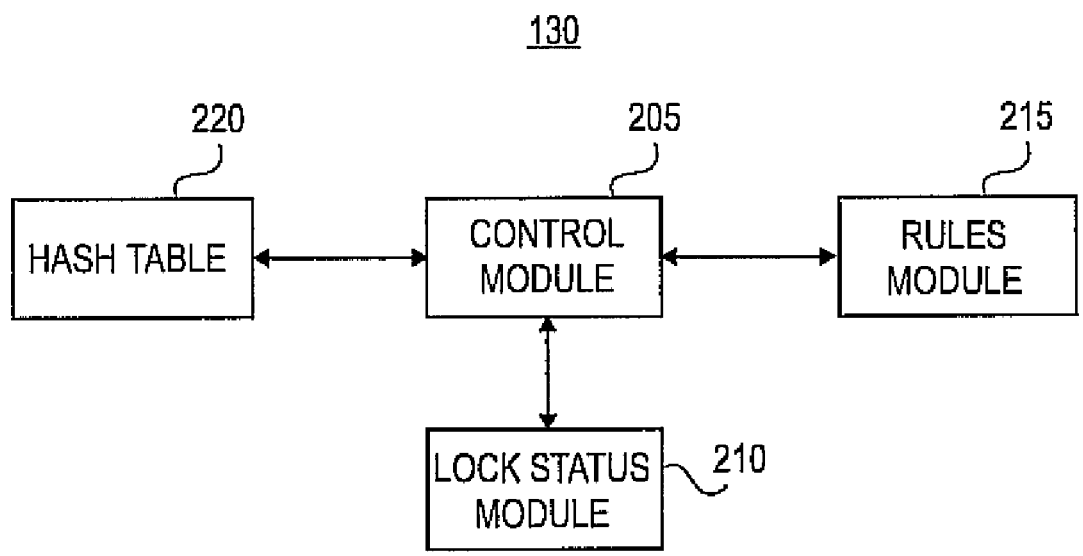
FIG. 2 illustrates a block diagram of the kernel lock validator in accordance with another embodiment.

FIG. 2 illustrates a more detailed diagram of the kernel lock validator 130 in accordance with another embodiment. It should be readily obvious to one of skilled in that art that the kernel lock validator 130 depicted in FIG. 2 is a schematic illustration and additional components can be added and existing components can be modified or removed.

As shown in FIG. 2, the kernel lock validator 130 can comprise a control module 205, a lock status module 210, a rules module 215 and a hash table 220. The control module 205 can be configured to manage and provide the functionality of the kernel lock validator 130. The control module 205, as with the other noted modules, can be implemented as a software routine (applet, program, etc.), a hardware component (ASIC, FPGA, etc.) or a combinations thereof.

The control module 205 can also be configured to track lock-types as opposed to tracking each individual instance of the lock-type. The lock-type is registered when it used for the first time after bootup and all subsequent uses of the registered lock-type will be attached to this lock-type. Accordingly, each lock type is assigned a specific key based on the registration of the lock-type. The control module 205 can be configured to create a static variable (e.g., (_key)) for statically declared locks and uses the address of the statically declared lock as the key. The control module 205 can maintain the information regarding the lock types and associated keys in the lock status module 210.

The control module 205 can be further configured to track lock-type usage by using a series of state bits: (1) ever held in hard interrupt context (hardirq-safe); (2) ever held in soft interrupt context (softirg-safe); (3) ever held in hard interrupt with interrupts enabled (hardirq-unsafe); (4) ever held with soft interrupts and hard interrupts enabled (softirq-unsafe); and (5) ever used (!unused). With these state bits, the control module 205 can be configured to test each locking operation with the predetermined rules stored in the rules module 215.

The rules module 215 can be configured to store the rules that the control module 205 uses to check each lock operation. The rules module 215 can be configured to stores rules such as a softirq-unsafe is automatically a hardirq-unsafe. Another rule is that following states are exclusive, i.e., can only be set for any lock type: (1) hardirq-safe and hardirq-unsafe; and (2) softirq-safe and softirq-unsafe. Yet another rule is that the same lock-type cannot be acquired twice as well as two locks cannot be acquired in different order. Yet another rule is that the following lock dependencies are not permitted: (1) hardirq-safe to hardirq-unsafe; and (2) softirq-safe to softirq-unsafe. Accordingly, the above rules are enforced for any locking sequence that occurs in the kernel 120: when acquiring a new lock, the control module 205 checks whether there is any rule violation between the new lock and any of the held locks.

There are additional rules for when a lock type changes state. One rule is if a new hardirq-safe lock is discovered, the lock validator determines whether it took any hardirq-unsafe lock in the past. A second change of state rule is if a new softirq-safe lock is discovered, the control module 205 determines whether it took any softirq-unsafe lock in the past. A third change of state rule is if a new hardirq-unsafe lock is discovered, the lock validator determines whether any hardirq-safe lock took it in the past. A fourth change of state rule is if a new softirq-unsafe lock is discovered, the lock validator determines whether any softirq-safe lock took it in the past. It should be readily that the list of rules for exemplary and new rules or existing rules modified without departing from the scope of the claimed invention.

As there are multiple rules, the ordering of the rules as they are tested is an additional requirement. Accordingly, the control module 205 can be configured to maintain two lists. A first list, a "before" list contains all locks which have ever been held when the lock of interest (referred to a L) is acquired. As a result, the before list contains the keys of all locks acquired before the L, the lock of interest. The second list, an "after" list, holds all locks acquired while the lock of interest is held. The before and after lists can be implemented using data structures such as a buffer, linked lists, and other similar referencing structures.

Figure 3:
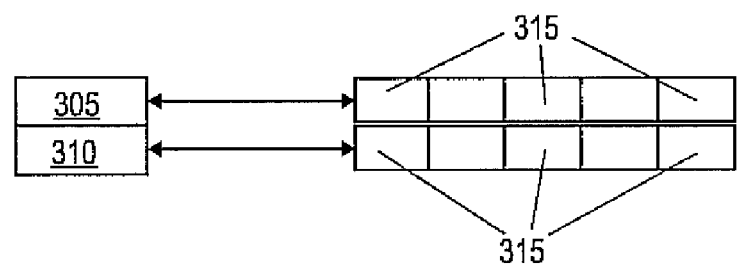
FIG. 3 depicts data structure in accordance with yet another embodiment.

FIG. 3 depicts a block diagram of a first and second data structure 305, 310, respectively for implementing storing the before list and the after list. As shown in FIG. 3, first data structure 305 and second data structure 310 can be implemented as a series of memory spaces 315. The size of the memory space 315 can be dependent on the type of processor. More particularly, a 32-bit processor may indicate that the size of the memory space 315 is a 32-bit word as an example. In other embodiments, a user can alter the size of the memory space 315.

Returning to FIG. 2, the control module 205 can be configured to check whether any locks on the "after" list associated with the lock of interest, L, is already held. The control module 205 should not find any lock being held. However, if a lock is found, the control module 205 can signal an error.

The control module 205 can also be configured to link the after list of L with the before lists of the other currently held locks to determine any ordering or interrupt violations anywhere within that chain. If the control module 205 determines that the tests are passed, the control module 205 updates the various "before" and "after" lists.

Since all this checking can impose a large amount of processor time, the control module 205 can be configured to maintain a third data structure, a list of currently held locks. The third data structure can be implemented as a simple buffer, a linked list or other similar searchable reference structure. From the sequence of the list of currently held locks, the control module 205 can be configured to generate a 64-bit hash value when the sequence of locks has been validated, i.e., cleared of any conflicts. The control module 205 then stores this 64-bit hash value into the hash table 220. Subsequently, when the control module 205 encounters the same sequence, of locks, the control module 205 can generate a second 64-bit hash value to compare against the values stored in the hash table 220. If the control module 205 determines there is match, the control module 205 knows the second sequence has been checked against the rules stored in the rules module 215.

Figure 4:
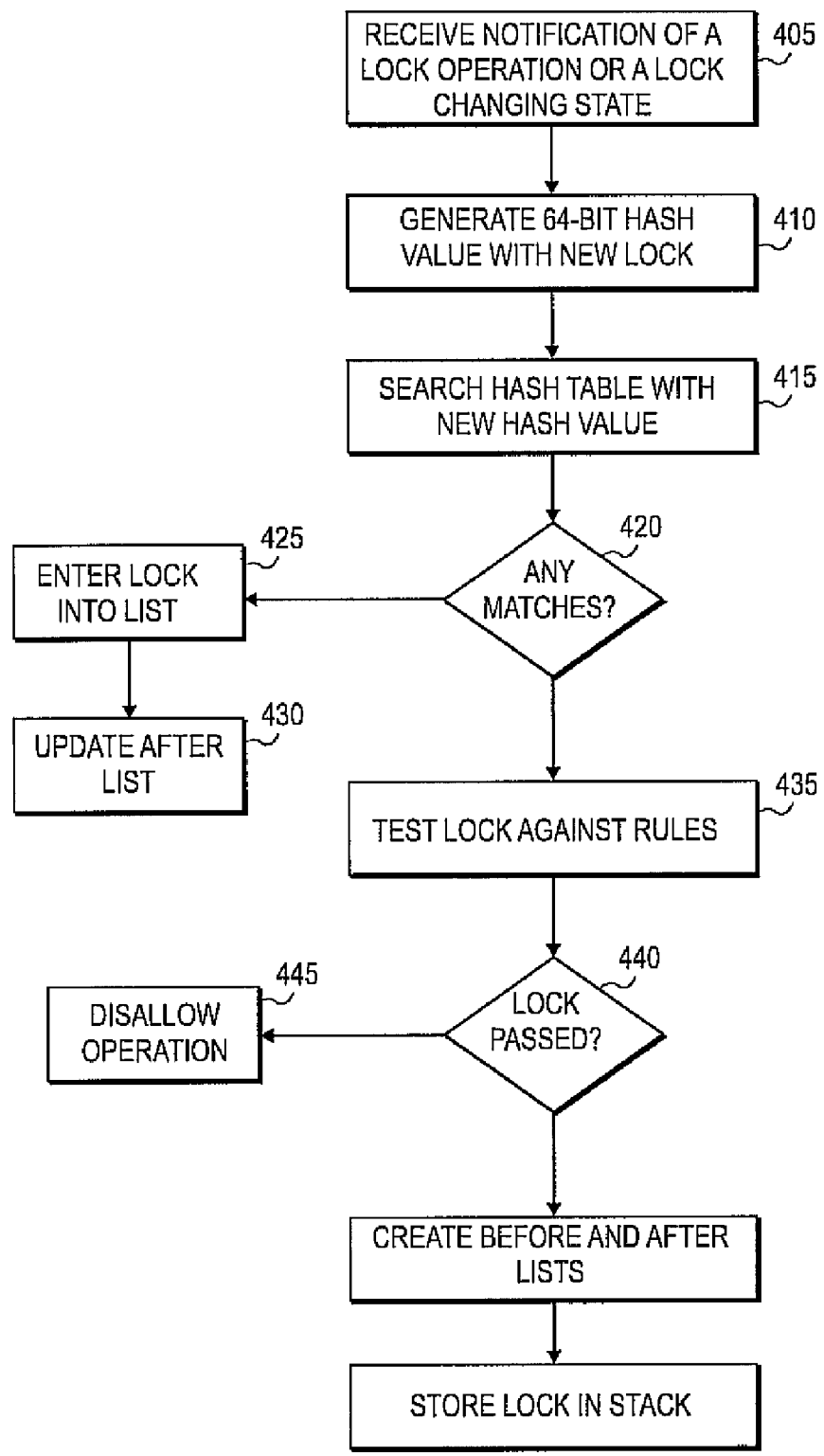
FIG. 4 depicts a flow diagram in accordance with yet another embodiment.

FIG. 4 illustrates a flow diagram 400 executed by the control module 205 of the kernel lock validator 135 in accordance with another embodiment. It should be readily obvious to one of skilled in that art that the flow diagram 400 depicted in FIG. 4 is a schematic illustration and additional steps can be added and existing steps can be modified or removed.

As shown in FIG. 4, the control module 205 can receive notification of an acquisition of a lock, L, by a process, thread, etc., in step 405. Alternatively, the control module 205 can also receive notification that a lock is changing state, e.g., being released.

In step 410, the control module 205 can be configured to generate a 64-bit hash value of the sequence with the lock, L, as a temporary last entry into the data structure that holds the list of currently held locks. The hash value can be regarded as a 'frontside cache' so as to avoid testing of all held locks against the set of rules. The control module 205 can be configured to keep a 'rolling' 64-bit hash of the current 'stack of locks', which is updated when a lock in the stack is released or when a new lock is acquired. The update of the update 64-bit hash does not need to be recalculate the full has of all held locks because the hash generation step is reversible.

In step 415, the control module 205 can be configured to search the hash table 220 with the generated 64-bit hash value. If there is match, in step 420, the control module 205 knows that this sequence had previously been validated and the lock, L, is entered into the data structure that holds the list of currently held locks, in step 425. The control module 205 also updates the after-lists of each currently held lock with the acquisition of lock, L, in step 430.

Otherwise, if there is not a match, in step 420, the control module 205 can be configured to test the lock, Lt, against the rules stored in the rules module 220, in step 435. More particularly, the control module 205 can be configured to validate a new dependency against all existing dependencies. For example, if L2 has been taken after L1 in the past, and a L2=>L1 dependency is added, this condition is determined to be a violation. In essence, new dependencies are only added when they do not conflict with existing rules (or dependencies). Accordingly, the control module 205 can set the state of the lock, L, being acquired. Subsequently, the control module 205 can apply the rules stored in the rules module 215.

Alternatively, if the lock, L, is changing state, the control module 205 can test the lock, L, against the rules for lock changing state.

If the lock, L, did not pass the rules, in step 440, the acquiring entity is informed of the error and is disallowed from acquiring the lock, in step 445. Otherwise, in step 450, the control module 205 can be configured to create data structures for the before list 305 and after list 310. The control module 205 can also store the lock, L, in the data structure for storing currently held locks.

In step 450, the control module 205 can generate a 64-bit hash value on the current sequence of the list of currently held locks and subsequently stored in the hash table 220.

Figure 5:
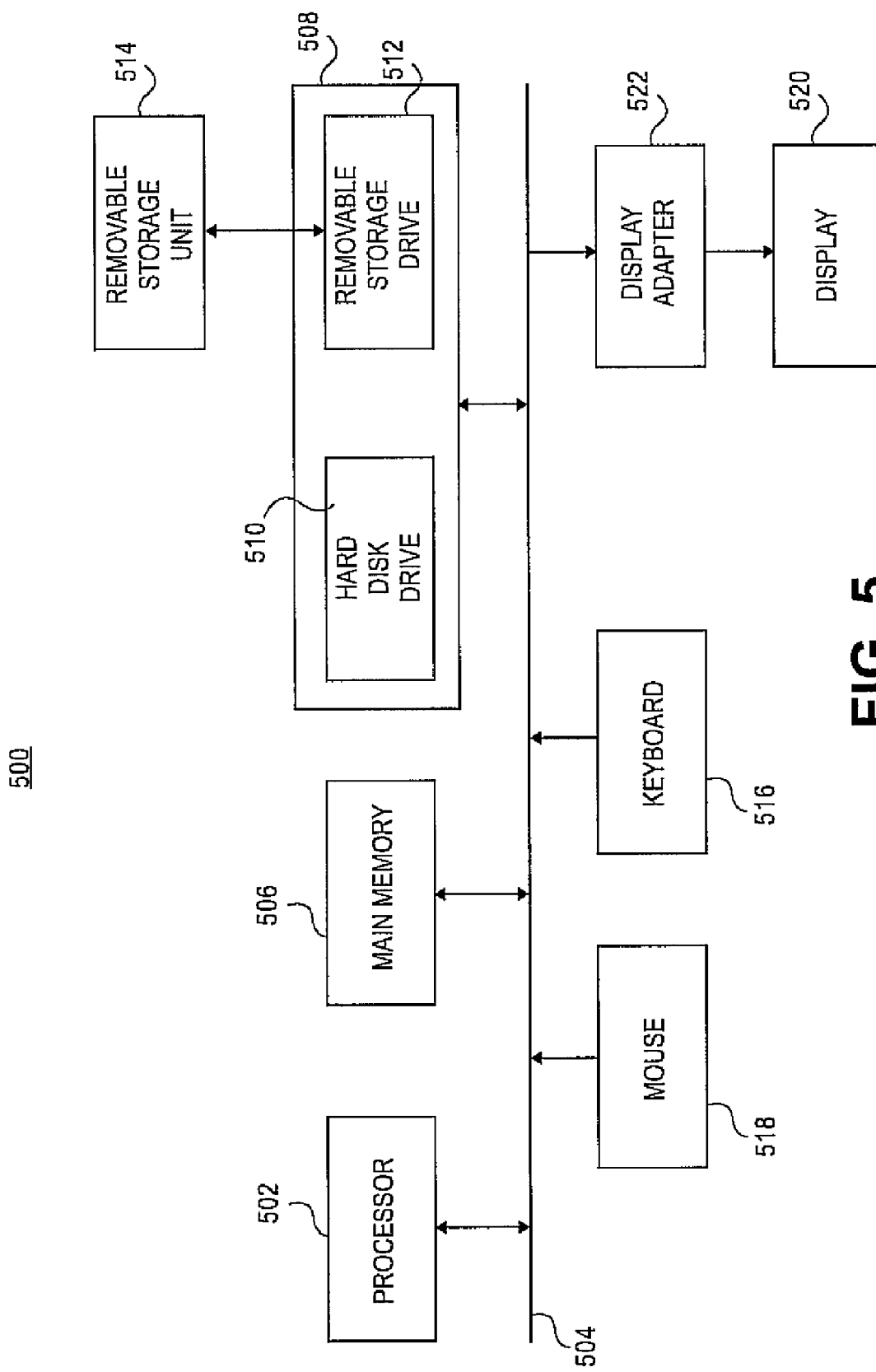
FIG. 5 illustrates a computing platform the software environment depicted in FIG. 1.

FIG. 5 depicts an exemplary computing platform 500 configured to execute the kernel lock validator 130 in accordance with yet another embodiment. The functions of the kernel lock validator 130 may be implemented in program code and executed by the computing platform 500. The kernel lock validator 130 can be implemented in computer languages such as PASCAL, C, C++, JAVA, etc.

As shown in FIG. 5, the computer system 500 includes one or more processors, such as processor 502 that provide an execution platform for embodiments of the kernel lock validator 130. Commands and data from the processor 502 are communicated over a communication bus 504. The computer system 500 also includes a main memory 506, such as a Random Access Memory (RAM), where the kernel lock validator 130 can be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the kernel lock validator 130 can be stored. The removable storage drive 512 reads from and/or writes to a removable storage unit 514 in a well-known manner. A user interfaces with the kernel lock validator 130 with a keyboard 516, a mouse 518, and a display 520. A display adapter 522 interfaces with the communication bus 504 and the display 520. The display adapter 522 also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method, implemented using a processor, of preventing resource access bugs in a kernel, the method comprising:
   generating a first hash value from a sequence of held locks;
   intercepting a lock operation in a software component before the lock operation completes;
   adding the lock operation as a temporary last entry to a sequence of currently held locks to produce a proposed sequence of currently held locks;
   generating a second hash value from the proposed sequence of currently held locks;
   testing, using the processor, whether the second hash value equals the first hash value;
   if the second hash value does not equal the first hash value, then testing, using the processor, an associated lock type of the lock operation against a set of rules for administering lock operations; and
   determining an action based on the associated lock type conflicting with one of the rules of the set of rules for administering lock operations.

2. The method of claim 1, wherein the action based on the associated lock type further comprises determining whether the associated lock type has been taken after the lock operation has occurred.

3. The method of claim 1, further comprising assigning a key to the lock operation.

4. The method of claim 1, further comprising creating a first data structure and a second data structure, wherein the first data structure stores all the previous lock types of locks held prior to the lock operation and the second data structure stores all the subsequent lock types of locks acquired after the lock operation.

5. The method of claim 4, further comprising:
   connecting the second data structure with respective first data structure of each currently held lock; and
   determining for each connected second data structure and respective first data structure of each currently held lock any ordering violations.

6. The method of claim 4, further comprising:
   connecting the second data structure with respective first data structure of each currently held lock by a kernel; and
   determining for each connected second data structure and respective first data structure of each currently held lock by the kernel any interrupt violations.

7. The method of claim 1, wherein generating a first hash value further comprises:
   maintaining a queue configured to hold the sequence of currently held locks;
   generating the first hash value from a state of the queue; and
   storing the first hash value in a data structure.

8. The method of claim 7, wherein testing whether the second hash value equals the first hash value further comprises:
   retrieving the first hash value from the data structure; and
   comparing the second hash value with the first hash value.

9. The method of claim 8, further comprising storing the second hash value in response to the second hash value not matching the first hash value retrieved from the data structure.

10. The method of claim 8, further comprising avoiding testing the associated lock type of the lock operation against the set of rules in response to the second hash value matching the first hash value retrieved from the data structure.

11. A system for preventing resource access conflicts in a software component, the system comprising:
    a memory containing instructions;
    a processor, operably connected to the memory, that executes the instructions;
    wherein the memory includes:
      a rules module configured to store rules for administrating locks in the software component;
      a data structure configured to store a sequence of currently held locks; and
      a control module configured to interface with the rules module and the data structure, wherein the control module is configured to perform operations comprising:
        generating a first hash value from a sequence of held locks;
        intercepting a lock operation in the software component before the lock operation completes;
        adding the lock operation as a temporary last entry to the sequence of currently held locks to produce a proposed sequence of currently held locks;
        generating a second hash value from the proposed sequence of currently held locks;
        testing whether the second hash value equals the first hash value;
        if the second hash value does not equal the first hash value, then testing an associated lock type of the lock operation against the rules for administering locks stored by the rules module; and
        reporting an error based on the associated lock type conflicting with one of the rules.

12. The system of claim 11, wherein the control module is further configured to determine whether the associated lock type has been taken after the lock operation has occurred.

13. The system of claim 11, wherein the control module is further configured to assign a key to the lock operation.

14. The system of claim 11, wherein the control module is further configured to create a first data structure and a second data structure in response to the lock operation instantiating a new lock type, wherein the first data structure stores all the previous lock types of locks held prior to the lock operation and the second data structure stores all the subsequent lock types of locks acquired after the lock operation.

15. The system of claim 14, wherein the control module is further configured to link the second data structure with respective first data structure of each currently held lock by a kernel and to determine for each connected second data structure and respective first data structure of each currently held lock by the kernel any ordering violations.

16. The system of claim 14, wherein the control module is further configured to link the second data structure with respective first data structure of each currently held lock and to determine for each connected second data structure and respective first data structure of each currently held lock any interrupt violations.

17. The system of claim 11, wherein the data structure comprises a queue configured to hold the sequence of currently held locks and interfaced with the control module; and wherein the system further comprises:
 a hash table configured to interface with the control module, wherein the control module is configured to generate the first hash value from a state of the queue and to store the first hash value in the hash table.

18. The system of claim 17, wherein testing whether the second hash value equals the first hash value comprises
 retrieving the first hash value from the data structure and comparing the second hash value with the first hash value.

19. The system of claim 18, wherein the control module is further configured to store the second hash value in response to the second hash value not matching the first hash value retrieved from the data structure.

20. The system of claim 18, wherein the control module is further configured to avoid testing the associated lock type of the lock operation against the set of rules in response to the second hash value matching the first hash value retrieved from the data structure.

21. The method of claim 1, wherein if the second hash value equals the first hash value, then allowing the lock operation to proceed.

22. The system of claim 11, wherein the control module is configured to perform operations comprising:
 if the second hash value equals the first hash value, then allowing the lock operation to proceed.

* * * * *